(12) United States Patent
Wittmaak et al.

(10) Patent No.: US 11,702,189 B1
(45) Date of Patent: Jul. 18, 2023

(54) ACTUATED BLADE-PITCH CHANGE MECHANISMS

(71) Applicant: Textron Innovations Inc., Providence, RI (US)

(72) Inventors: John Robert Wittmaak, Newark, TX (US); Alan Hisashi Steinert, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/890,063

(22) Filed: Aug. 17, 2022

(51) Int. Cl.
| | |
|---|---|
| *B64C 11/30* | (2006.01) |
| *F04D 29/36* | (2006.01) |
| *B64C 11/06* | (2006.01) |
| *B64C 11/44* | (2006.01) |
| *B64C 11/34* | (2006.01) |

(52) U.S. Cl.
CPC .............. *B64C 11/44* (2013.01); *B64C 11/06* (2013.01); *B64C 11/34* (2013.01); *F04D 29/362* (2013.01)

(58) Field of Classification Search
CPC ......... B64C 11/06; B64C 11/30; B64C 11/32; B64C 11/34; B64C 11/36; B64C 11/44; B64U 50/19; F04D 29/36; F04D 29/362; F04D 29/364; B63H 3/00; B63H 3/02
See application file for complete search history.

(56) References Cited

U.S. PATENT DOCUMENTS

| | | | | |
|---|---|---|---|---|
| 3,294,176 A | * | 12/1966 | Reimers | B64C 11/34 416/164 |
| 3,967,916 A | * | 7/1976 | Chittom | F04D 29/362 416/157 R |
| 4,347,997 A | | 9/1982 | Byham et al. | |
| 4,948,339 A | * | 8/1990 | Adamson | B64C 11/30 416/89 |
| 6,986,688 B1 | | 1/2006 | Jansen | |
| 8,979,496 B2 | * | 3/2015 | Eyraud | B64C 11/44 416/155 |
| 9,102,396 B2 | * | 8/2015 | Curren | B64C 11/04 |
| 2006/0192046 A1 | | 8/2006 | Heath et al. | |
| 2016/0083077 A1 | | 3/2016 | Rawdon | |
| 2018/0155015 A1 | | 6/2018 | Thompson et al. | |
| 2020/0391847 A1 | | 12/2020 | Fenny et al. | |

OTHER PUBLICATIONS

Wittmaak, John Robert et al.; "Active Blade-Pitch Change Systems and Methods"; U.S. Appl. No. 17/729,646, filed Apr. 26, 2022; 37 pages.
Wikipedia [online], "Control Theory", 2020, [retrieved on Nov. 22, 2022], Retrieved from the Internet: <URL:<https://web.archive.org/web/20201223011027/https://en.wikipedia.org/wiki/Control_theory>.

* cited by examiner

*Primary Examiner* — Justin D Seabe
(74) *Attorney, Agent, or Firm* — Bradley Arant Boult Cummings LLP

(57) ABSTRACT

A blade-pitch change mechanism includes a motor comprising a rotating motor shaft and a housing, a solenoid coupled to a first end of the rotating motor shaft and to the housing, and a hub coupled with a second end of the rotating motor shaft. The hub includes a cylindrical puck having formed therein a gated castellated groove and connected to the second end of the rotating motor shaft and a cylindrical blade-pitch hub selectively couplable with the cylindrical puck via a plurality of drive pins and having formed therein a blade-pitch adjustment groove.

20 Claims, 5 Drawing Sheets

ACTUATED BLADE-PITCH CHANGE MECHANISMS

CROSS-REFERENCE TO RELATED APPLICATIONS

This patent application incorporates by reference the entire disclosure of U.S. patent application Ser. No. 17/729,646, filed on Apr. 26, 2022.

TECHNICAL FIELD

This disclosure relates in general to the field of rotor-blade pitch-change mechanisms, and more particularly, but not by way of limitation, to actuated rotor-blade pitch-change mechanisms in multi-rotor aircraft.

BACKGROUND

This section provides background information to facilitate a better understanding of various aspects of the disclosure. It should be understood that statements in this section of this document are to be read in this light and not as admissions of prior art.

Variable-speed control systems such as those used on multi-rotor aircraft may benefit from rotor blade-pitch changes for operation under different operating environments or flight regimes (e.g., cruise or forward-flight mode vs. hover mode). Such systems are preferably affordable and simple. Aircraft that use fixed-pitch variable RPM control often are limited from a performance standpoint due to RPM or torque limitations. What is optimal for cruise is often not optimal for hover; therefore, in many cases, significant trade-offs must be made to balance both extremes. In some cases, different operational environments make different rotor blade-pitch ranges desirable.

SUMMARY

A blade-pitch change mechanism includes a motor comprising a rotating motor shaft and a housing, a solenoid coupled to a first end of the rotating motor shaft and to the housing, and a hub coupled with a second end of the rotating motor shaft. The hub includes a cylindrical puck having formed therein a gated castellated groove and connected to the second end of the rotating motor shaft and a cylindrical blade-pitch hub selectively couplable with the cylindrical puck via a plurality of drive pins and having formed therein a blade-pitch adjustment groove.

A blade-pitch change mechanism includes a hub coupled to a rotating motor shaft. The hub includes a cylindrical puck having formed therein a gated castellated groove and connected to rotate responsive to rotation of the rotating motor shaft and a cylindrical blade-pitch hub selectively rotatably couplable with the cylindrical puck via a plurality of drive pins and having formed therein a blade-pitch adjustment groove. The blade-pitch change mechanism also includes a rotor blade comprising a blade-pitch restraint pin that rides in the blade-pitch adjustment groove. Pitch of the rotor blade is adjustable according to a position of the blade-pitch restraint pin in the blade-pitch adjustment groove.

This summary is provided to introduce a selection of concepts that are further described below in the Detailed Description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following Detailed Description when read with the accompanying Figures. It is emphasized that, in accordance with standard practice in the industry, various features are not necessarily drawn to scale. In fact, the dimensions of various features may be arbitrarily increased or reduced for clarity of discussion.

DETAILED DESCRIPTION

Figure 1:
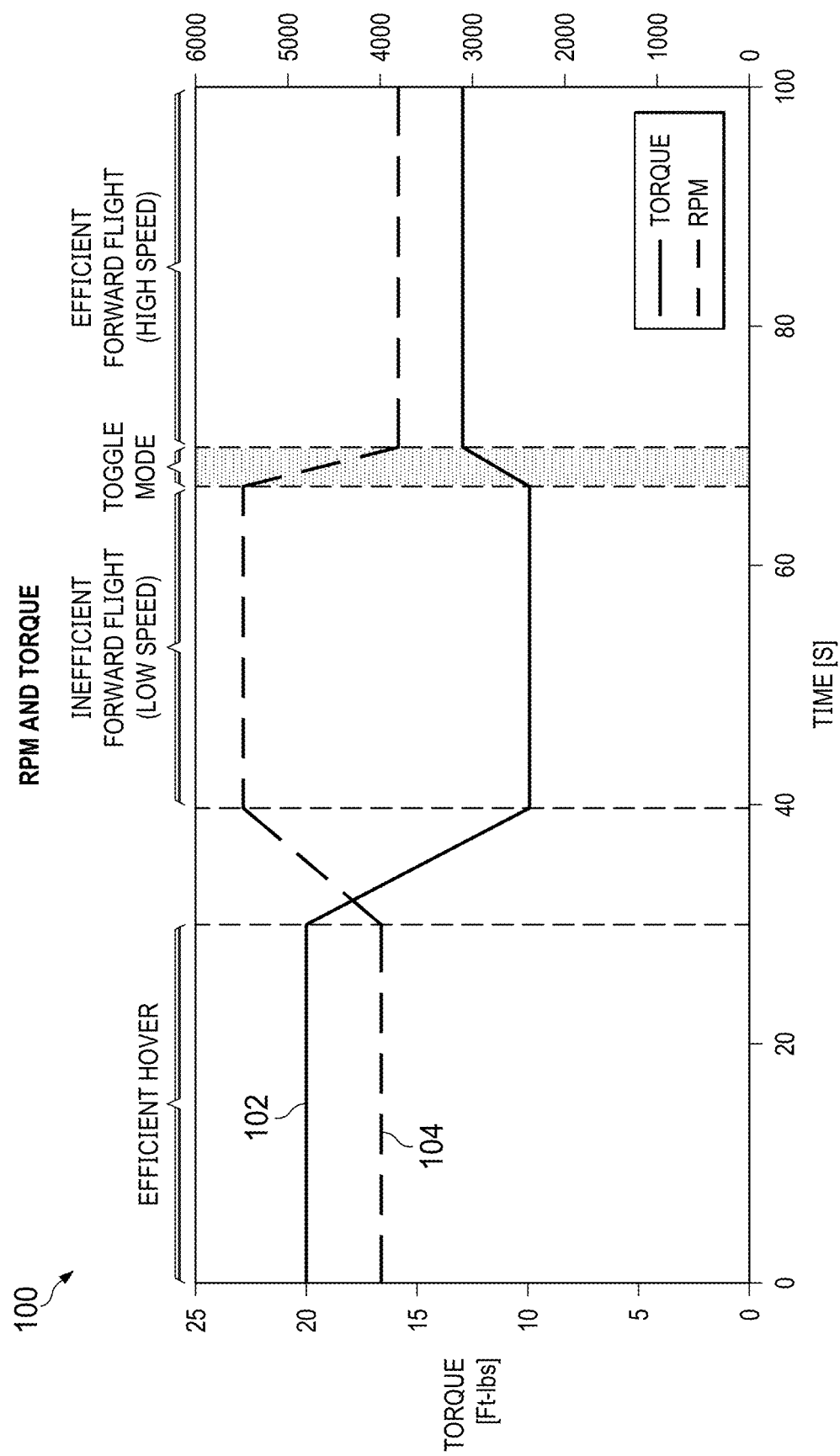
FIG. 1 graphically illustrates RPM and torque during different flight modes as a function of time.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a Figure may illustrate an illustrative embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following Detailed Description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Many multi-rotor aircraft, including unmanned logistics aircraft, utilize electric motors and achieve primary attitude control via in-flight differential thrust of multiple rotors of the multi-rotor aircraft. In a typical case, when variable motor speeds are employed to control such aircraft, collective or cyclic pitch of rotor blades of the aircraft are not utilized. Such aircraft tend to be simpler and have lower manufacturing and maintenance costs relative to similar aircraft that include mechanisms for collective or cyclic rotor-blade pitch control.

One option is conventionally actuated mechanisms that change pitch, which mechanisms often include features like bearings to go from rotating to not rotating or slip rings for wiring and actuators. These mechanisms and actuators often exhibit low reliability, require regular maintenance, and are costly. For aircraft for which low operating cost is a key performance parameter, these rotor blade-pitch change mechanisms are usually avoided in favor of lower-cost solutions that provide increased simplicity while sacrificing performance.

While multi-rotor aircraft with fixed-pitch rotor blades often exhibit improved reliability, lower manufacturing cost, and lower maintenance cost, performance tradeoffs often must be accepted. Fixed rotor blade-pitch aircraft often have a preferred blade-pitch position for hover. When the aircraft is in forward flight, such that there is an inflow of air, more blade pitch relative to a preferred hover blade-pitch position is typically necessary in order to keep a motor driving the rotor within its operating speed (i.e., RPM) range. Such a forward-flight mode is often referred to as cruise mode. The ability to change collective pitch would increase cruise efficiency of the aircraft; however, the ability to change collective pitch often requires additional mechanisms that increase the complexity of the aircraft. Those having skill in the art will also appreciate that a rotor blade can be designed that performs reasonably well in both hover and forward-flight conditions, but such an approach often results in unavoidable trade-offs.

FIG. 1 graphically illustrates RPM and torque during different flight modes as a function of time. In FIG. 1, a graph 100 includes torque 102 and RPM 104. The graph 100 begins at time 0, at which time the aircraft is in an efficient-hover mode, which mode requires that the torque 102 and RPM 104 both be relatively high, the torque 102 being illustrated as being approximately 20 foot-pounds and RPM 104 as approximately 4,100.

A transition from the efficient-hover mode to forward flight begins at approximately 30 seconds, at which time the torque 102 decreases and RPM 104 increases, such that RPM 104 is approximately 5,700 and the torque 102 is approximately 10 foot-pounds, which values are indicative of inefficient forward flight. Responsive to detection of the inefficient forward-flight mode, a toggle mode begins at approximately 67 seconds, which toggle mode results in a reduction of RPM 104 to less than 4,000 and an increase of the torque 102 to approximately 12 foot-pounds, which represent efficient forward flight. The transition from inefficient forward flight to efficient forward flight can be achieved by a change in blade pitch from a state suited for efficient hover to a state suited for efficient forward flight.

Figure 2:
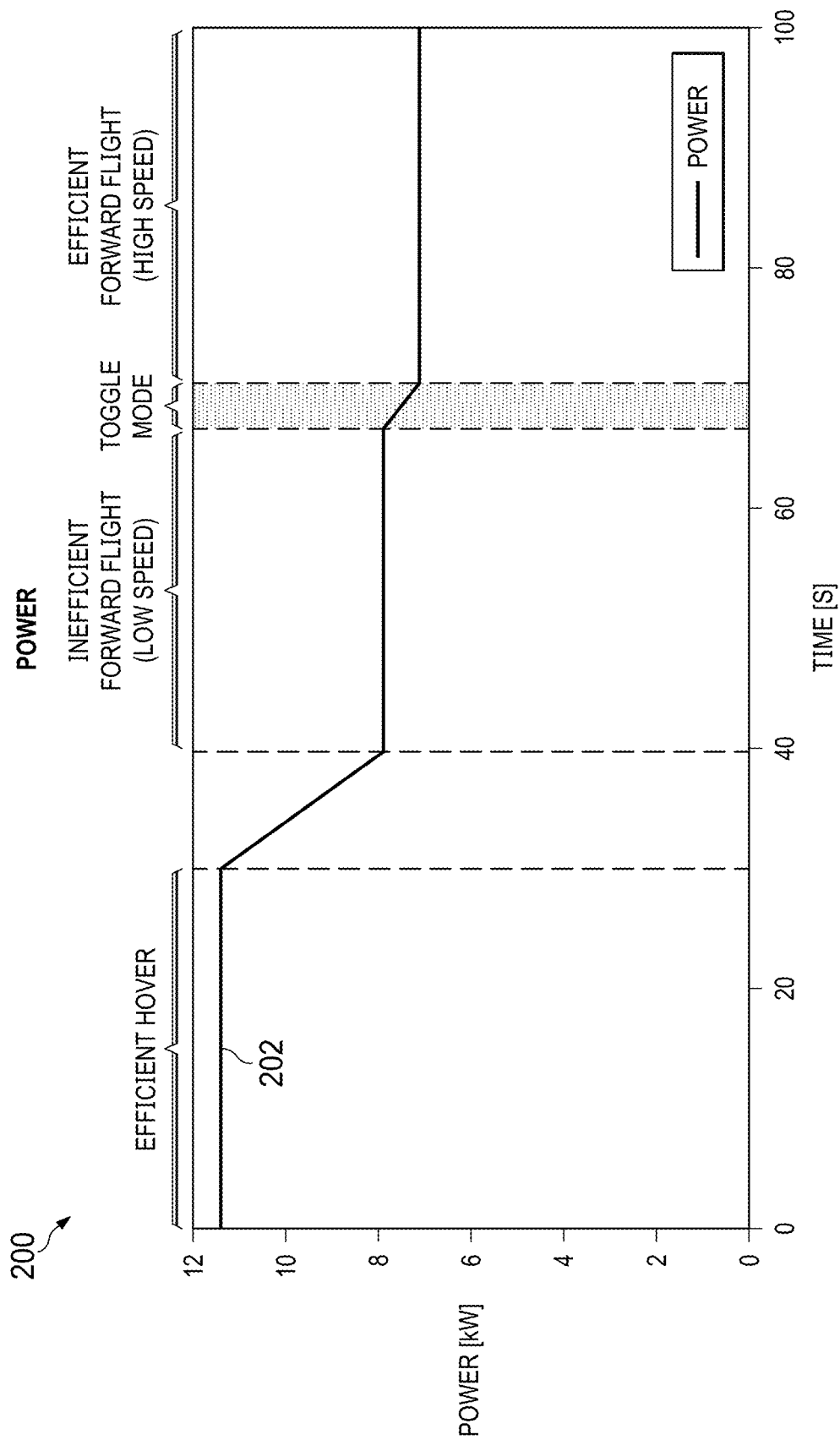
FIG. 2 graphically illustrates power (kW) during different flight modes as a function of time.

FIG. 2 graphically illustrates power in kilowatts during the same different flight modes as FIG. 1 as a function of time. In similar fashion to FIG. 1, graph 200 illustrates power 202 as high (i.e., ~11.5 kW) during the efficient-hover mode. Power reduces to approximately 8 kW during the transition beginning at 30 seconds to the inefficient forward-flight mode, during which mode power decreases to approximately 8 kW. Upon detection of the inefficient forward-flight mode, a toggle mode, which often results in a blade-pitch change, is initiated at approximately 67 seconds, which toggle mode results in efficient forward flight characterized by a reduction in torque, which torque is illustrated as approximately 7.5 kW.

Figure 3:
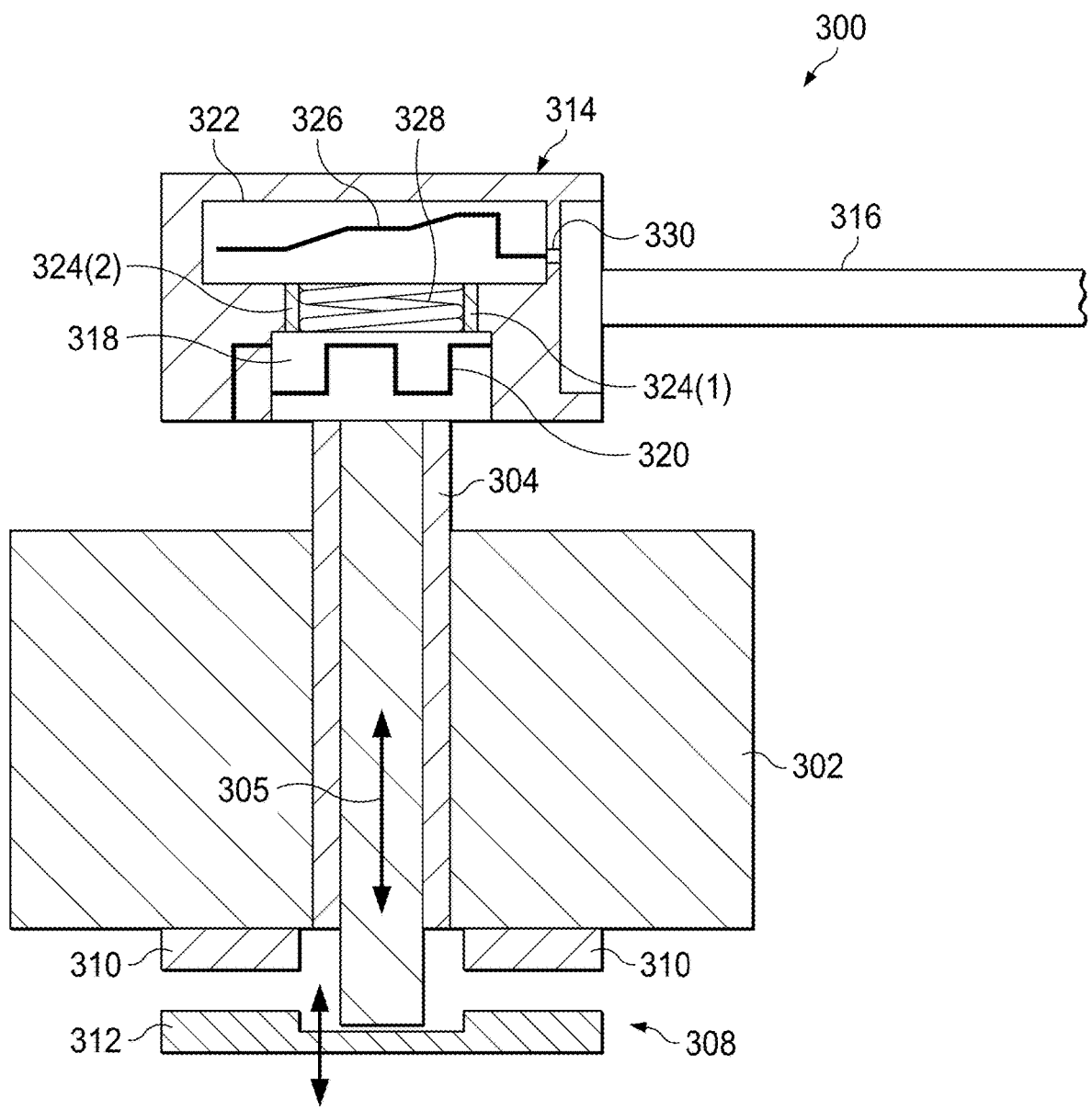
FIG. 3 is a cross-sectional view of an actuated blade-pitch change mechanism in a state in which an actuating solenoid is disengaged.

FIG. 3 is a cross-sectional view of a blade-pitch change mechanism in a state in which an actuating solenoid is disengaged. In FIG. 3, a blade-pitch change mechanism 300 is illustrated. Some components of the blade-pitch change mechanism 300 shown and described are perpendicular to the cross-sectional view, while others are planar to the view, in order to simplify the images. In a typical embodiment, the blade-pitch change mechanism 300 includes 2-4 rotor blades; therefore, some components shown may apply to a rotor blade not explicitly illustrated.

The blade-pitch change mechanism 300 includes a motor 302 that rotates a motor shaft 306 housed within a motor mast 304 that rotates about an axis 305. A solenoid 308 is shown integrated into a bottom portion of the motor 302. The solenoid 308 is in a disengaged (i.e., open and non-energized) position in which an upper portion 310 connected to a non-rotating housing of the motor 302 and a lower portion 312 connected to a bottom end of the motor shaft 306 are disconnected from one another. The lower portion 312 rotates with the motor shaft 306. The upper portion 310 does not rotate. The lower portion 312 moves upward along the axis 305 toward the upper portion and engages therewith when the solenoid 308 is engaged and in the opposite direction when the solenoid 308 is disengaged.

A hub 314 is positioned above and is inter-operably coupled to the motor shaft 306. The hub 314 rotates responsive to rotation of the motor shaft 306. The hub 314 is inter-operably coupled to a rotor blade 316, only a portion of which is shown in FIG. 3. In a typical embodiment, a plurality of rotor blades 316 are coupled to the blade-pitch change mechanism 300. The hub 314 includes a cylindrical puck 318 that rotates about the axis 305. The cylindrical puck 318 includes a gated castellated groove 320 that serves to limit rotation of the rotor blade 316 in a stepwise fashion as will be described in more detail below. The gated castellated groove 320 extends around a circumference of the cylindrical puck 318 and includes a plurality of upper horizontal sections and a plurality of lower horizontal sections, succeeding upper horizontal sections and lower horizontal sections being separated by a vertical section.

The hub 314 also includes a cylindrical blade-pitch hub 322 that rotates about the axis 305, is positioned above the cylindrical puck 318, and has extending therefrom a plurality of drive pins, drive pins 324(1) and 324(2) being illustrated extending downward from the cylindrical blade-pitch hub 322 toward a top portion of the cylindrical puck 318. The drive pins 324(1) and 324(2) are illustrated as disengaged from a top portion of the cylindrical puck 318 due to the fact that the solenoid 308 is disengaged. As will be described in more detail below, engagement of the solenoid 308 drives the motor shaft 306 upward and causes the cylindrical puck 318 and the cylindrical blade-pitch hub 322 to engage with one another via the drive pins 324(1) and 324(2) such that the cylindrical puck 318 and the cylindrical blade-pitch hub 322 to be locked together rotationally.

The cylindrical blade-pitch hub 322 includes a blade-pitch adjustment groove 326, three progressive states of the blade-pitch adjustment groove 326 being illustrated and that correspond to three horizontal portions of the gated castellated groove 320 of the cylindrical puck 318. The blade-pitch adjustment groove 326 extends completely around a circumference of the cylindrical blade-pitch hub 322. A spring 328 biases the cylindrical puck 318 downward relative to the cylindrical blade-pitch hub 322 such that, when the cylindrical puck 318 is not forced upward due to engagement of the solenoid 308, the drive pins 324(1) and 324(2) do not engage the cylindrical puck 318.

A blade-pitch restraint pin 330 rides in the blade-pitch adjustment groove 326, a position of the blade-pitch restraint pin 330 in the blade-pitch adjustment groove 326 being offset from a centerline of the rotor blade 316 and used to control a pitch of the rotor blade 316. A portion of the blade-pitch adjustment groove 326 with which the blade-pitch restraint pin 330 is engaged is not readily visible in FIG. 3. A pin 332 is shown engaged in an upper vertical section of the gated castellated groove 320 in a plane substantially perpendicular to the cross-section shown in FIG. 3. A portion of the gated castellated groove 320 with which the pin 332 is engaged is not readily visible in FIG. 3.

In a typical embodiment, the solenoid 308 is operable to momentarily drive the motor shaft 306 upward. Contact between the solenoid 308, the bottom portion 312 of which does not rotate, and the upper portion 310, which rotates with the motor shaft 306, results in friction that effects a blade-pitch change but is brief enough to minimize friction, wear, and heat. The friction applies torque that is used to drive a rotary mechanism, which rotary mechanism includes the blade-pitch adjustment groove 326 that interfaces with the blade-pitch restraint pin 330 on a root of the rotor blade 316. As the blade-pitch restraint pin 330 follows a track path of the blade-pitch adjustment groove 326, the rotor blade 316 changes pitch.

Figure 4:
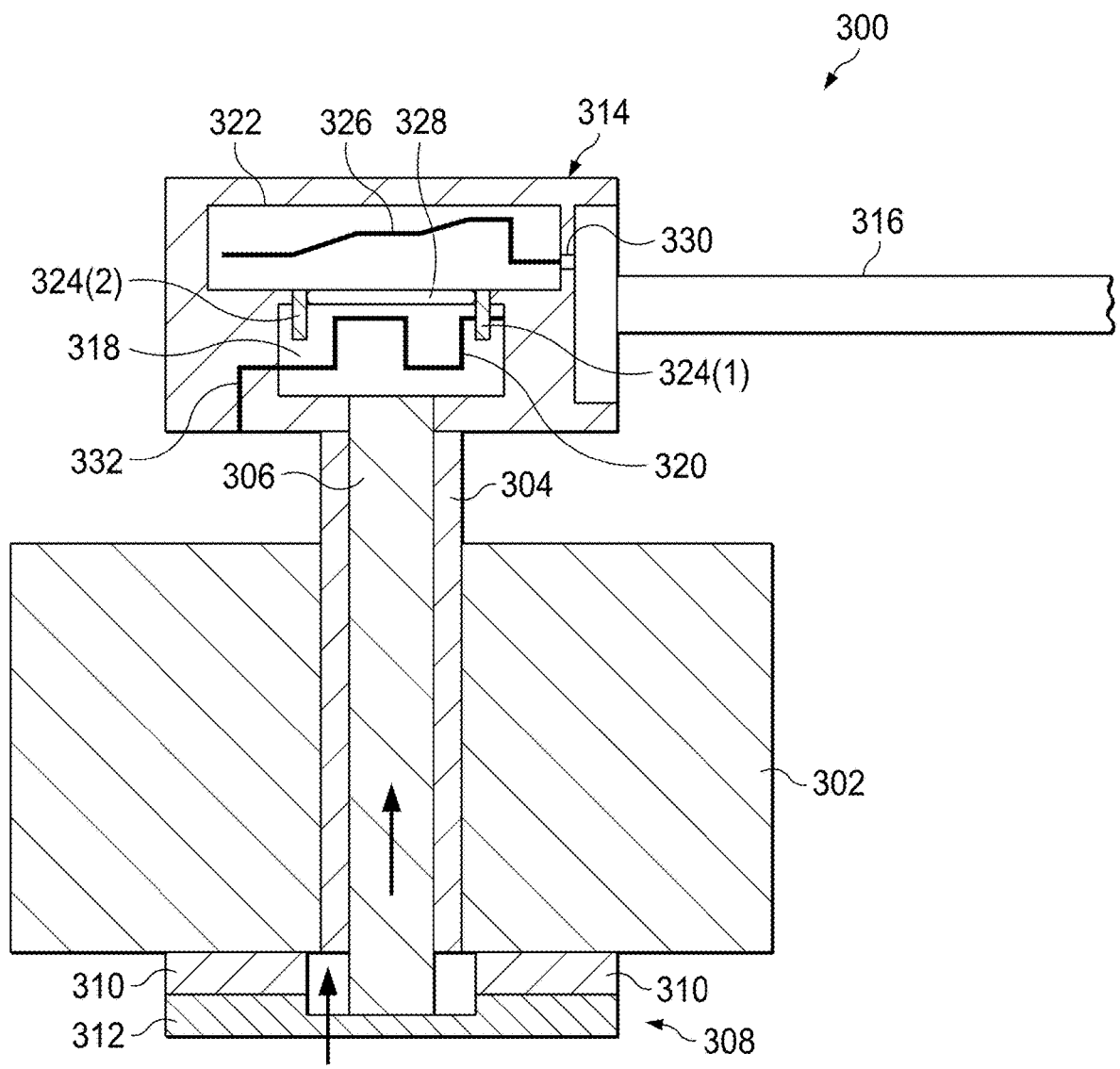
FIG. 4 is a cross-sectional view of the actuated blade-pitch change mechanism of FIG. 3 in a state in which the actuating solenoid is engaged.

FIG. 4 is a cross-sectional view of the blade-pitch change mechanism of FIG. 3 in a state in which the actuating solenoid is engaged. Responsive to engagement of the solenoid 308, friction between rotating and non-rotating surfaces of the blade-pitch change mechanism 300 creates torque up through the motor shaft 306 and the cylindrical puck 318. The friction creates heat; however, it is expected that, due to short engagement times, minimal risk of damage to components of the blade-pitch change mechanism 300 will occur.

Responsive to engagement of the solenoid 308, torque applied by virtue of friction between rotating and non-rotating portions of the blade-pitch change mechanism 300 causes the cylindrical puck 318 to rotate relative to the pin 332 along an upper horizontal section of the gated castellated groove 320 until the next vertical section of the gated castellated groove 320 is encountered by the pin 332.

The pin 332 is now positioned at an interface point between the upper horizontal section and the vertical section of the gated castellated groove 320. At this point, as the motor shaft 306 moves upward responsive to engagement of the solenoid 308, the pin 332 slides vertically downward in the gated castellated groove 320 from the interface point relative to the cylindrical puck 318. At the same time, the cylindrical puck 318 is driven upward by the motor shaft 306 onto the drive pins 324(1) and 324(2) such that the cylindrical puck 318 and the cylindrical blade-pitch hub 322 are rotationally coupled. Once the cylindrical puck is at the top of its travel path toward the cylindrical blade-pitch hub 322, the pin 332 enters the lower horizontal section of the gated castellated groove 320. As the cylindrical puck 318 rotates, so does the cylindrical blade-pitch hub 322 by virtue of the engagement therebetween via the drive pins 324(1) and 324(2).

As the motor mast 304 and the cylindrical puck 318 rotate together, the cylindrical blade-pitch hub 322 is rotationally driven via the drive pins 324(1) and 324(2). The rotor blade 316 is constrained about its aerodynamic center via a hole in the cylindrical blade-pitch hub 322, which allows the rotor blade 316 to rotate freely with little resistance. The rotor blade 316 is restrained to a given pitch setting via the blade-pitch restraint pin 330 in the root of the rotor blade 316, which blade-pitch restraint pin 330 rides in the blade-pitch adjustment groove 326. As the cylindrical blade-pitch hub 322 rotates, the blade-pitch restraint pin 330 rides on the blade-pitch adjustment groove 326 to a next successive blade-pitch setting, thereby changing the pitch of the rotor blade 316.

Figure 5:
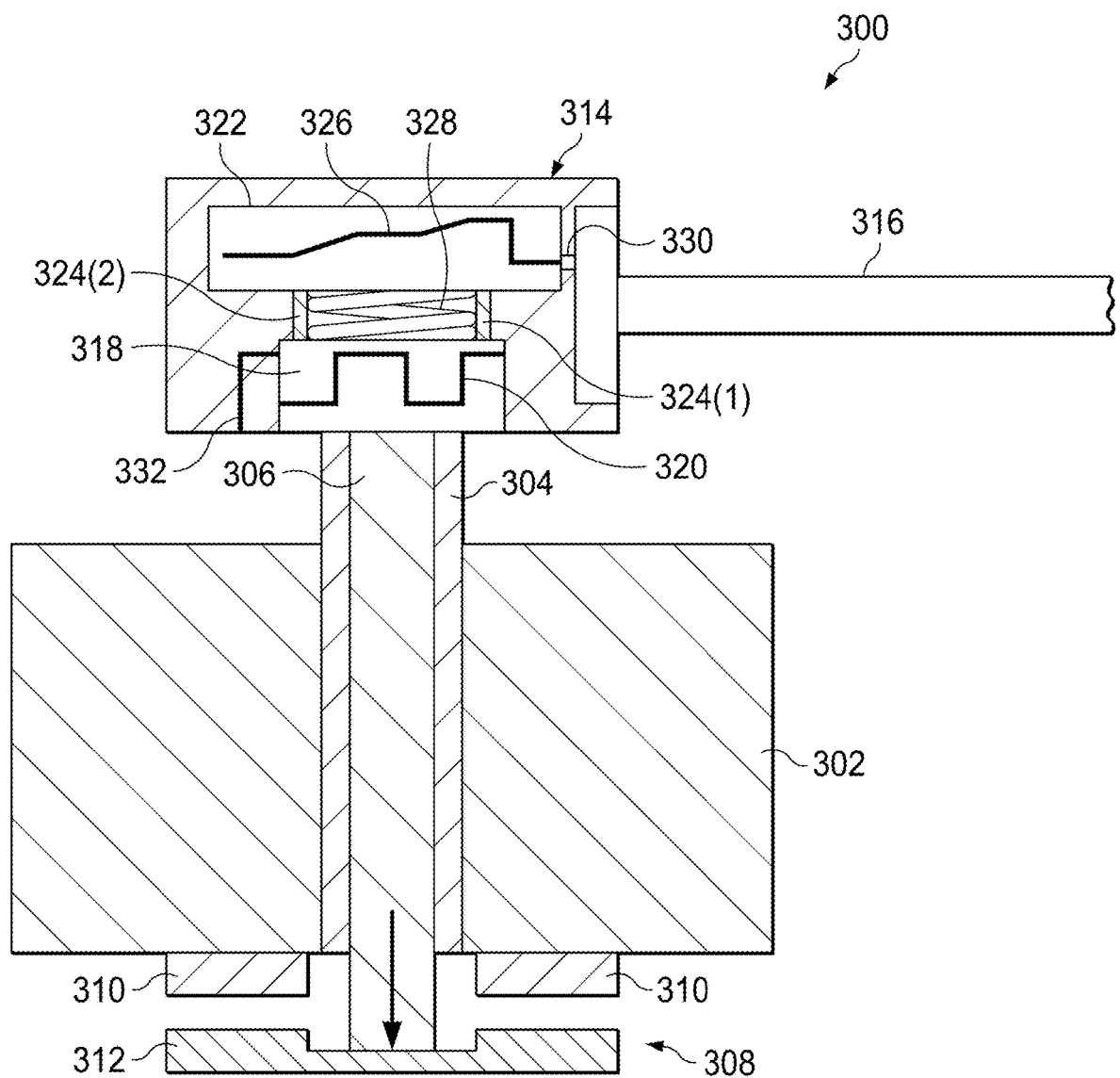
FIG. 5 is a cross-sectional view of the actuated blade-pitch change mechanism of FIG. 3 in a state in which the actuating solenoid is again disengaged.

FIG. 5 is a cross-sectional view of the blade-pitch change mechanism of FIG. 3 in a state in which the actuating solenoid is again disengaged. When the solenoid 308 releases, the spring 328 pushes the cylindrical puck 318 off the drive pins 324(1) and 324(2) and the motor shaft 306 moves downward as the upper portion 310 and the lower portion 312 separate relative to one another. In response, the pin 332 is free to move horizontally relative to rotation of the cylindrical puck 318 in a limited fashion along an upper horizontal section of the gated castellated groove 320; however, because the drive pins 324(1) and 324(2) are disengaged, this limited movement of the pin 332 does not affect a pitch position of the rotor blade 316. The pitch of the rotor blade 316 this remains in its current state until the solenoid 308 is again energized to cause the pitch of the rotor blade 316 to advance to the next position. In a typical embodiment, changes in pitch of the rotor blade 316 progress in a single direction in a stepwise manner. Although the solenoid 308 is described herein, a mechanism that provides perpendicular ratcheting force through the motor shaft 306 without use of a solenoid could also be employed. Various forms of electromagnetic or spring-loaded actuation that do not directly command rotor-blade pitch changes but rather use a linear force to create a rotational force in a stepwise fashion are also envisioned.

The cylindrical blade-pitch hub 322 is, in some embodiments, free to rotate within a limited range defined by the upper horizontal section of the gated castellated groove 320 in which the pin 332 is located, which rotation could allow the pitch of the rotor blade 316 to wander to a limited extent. If desired, friction in the blade-pitch change mechanism 300 could be tuned to resist such wandering. In similar fashion, in some embodiments, the blade-pitch adjustment groove 326 could be optimized with features to resist translation into sloped regions or a positive locking feature released when the cylindrical puck 318 and the drive pins 324(1) and 324(2) are engaged with one another.

In the specification, reference may be made to spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as inboard, outboard, above, below, upper, lower, or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term comprising within the claims is intended to mean including at least such that the recited listing of elements in a claim are an open group. The terms a, an and other singular terms are intended to include the plural forms thereof unless specifically excluded.

What is claimed is:

1. A blade-pitch change mechanism comprising:
a motor comprising a rotating motor shaft and a housing;
a solenoid coupled to a first end of the rotating motor shaft and to the housing; and
a hub coupled with a second end of the rotating motor shaft, the hub comprising:
a cylindrical puck having formed therein a gated castellated groove and connected to the second end of the rotating motor shaft; and
a cylindrical blade-pitch hub selectively couplable with the cylindrical puck via a plurality of drive pins and having formed therein a blade-pitch adjustment groove.

2. The blade-pitch change mechanism of claim 1, comprising a pin that rides in the gated castellated groove and moves relative to the gated castellated groove responsive to engagement of the solenoid.

3. The blade-pitch change mechanism of claim 1, wherein the rotating motor shaft moves axially toward the cylindrical blade-pitch hub responsive to engagement of the solenoid.

4. The blade-pitch change mechanism of claim 1, wherein engagement of the solenoid causes a pin that rides in the gated castellated groove to:
move horizontally along an upper horizontal section of the gated castellated groove as the cylindrical puck rotates about a rotational axis of the rotating motor shaft; and
upon reaching an interface point between the upper horizontal section and a vertical section of the gated castellated groove, move downward relative to the cylindrical puck to an interface point between the vertical section and a lower horizontal section of the gated castellated groove.

5. The blade-pitch change mechanism of claim 4, wherein:
engagement of the solenoid causes the rotating motor shaft to move upward; and
responsive to the upward movement of the rotating motor shaft, the cylindrical puck moves upward toward the cylindrical blade-pitch hub and engages with the drive pins of the cylindrical blade-pitch hub.

6. The blade-pitch change mechanism of claim 5, wherein, responsive to engagement of the cylindrical puck and the drive pins, rotation of the cylindrical puck causes rotation of the cylindrical blade-pitch hub.

7. The blade-pitch change mechanism of claim 6, wherein the blade-pitch adjustment groove has a blade-pitch restraint pin of a rotor blade coupled to the hub riding therein.

8. The blade-pitch change mechanism of claim 7, wherein movement of the blade-pitch restraint pin along the blade-pitch adjustment groove causes adjustment of a pitch of the rotor blade.

9. The blade-pitch change mechanism of claim 1, wherein the hub comprises a spring disposed between the cylindrical puck and the cylindrical blade-pitch hub and biased to cause the cylindrical puck to be disengaged from the plurality of drive pins unless the solenoid is engaged.

10. A blade-pitch change mechanism comprising:
a hub coupled to a rotating motor shaft, the hub comprising:
a cylindrical puck having formed therein a gated castellated groove and connected to rotate responsive to rotation of the rotating motor shaft; and
a cylindrical blade-pitch hub selectively rotatably couplable with the cylindrical puck via a plurality of drive pins and having formed therein a blade-pitch adjustment groove; and
a rotor blade comprising a blade-pitch restraint pin that rides in the blade-pitch adjustment groove;
wherein pitch of the rotor blade is adjustable according to a position of the blade-pitch restraint pin in the blade-pitch adjustment groove.

11. The blade-pitch change mechanism of claim 1, wherein:
a plurality of rotor blades are coupled to the hub; and
a pitch of each of the plurality of rotor blades is adjustable in a stepwise fashion responsive to a position of a blade-pitch restraint pin of the rotor blade in the blade-pitch adjustment groove.

12. The blade-pitch change mechanism of claim 10, wherein the hub comprises a spring disposed between the cylindrical puck and the cylindrical blade-pitch hub and biased to cause the cylindrical puck to be disengaged from the plurality of drive pins unless an opposing force is present.

13. The blade-pitch change mechanism of claim 10, comprising a pin that rides in the gated castellated groove and moves relative to the gated castellated groove responsive to axial movement of the rotating motor shaft.

14. The blade-pitch change mechanism of claim 10, wherein the rotating motor shaft moves axially toward the cylindrical blade-pitch hub responsive to engagement of a solenoid coupled to the rotating motor shaft.

15. The blade-pitch change mechanism of claim 14, wherein engagement of the solenoid causes a pin that rides in the gated castellated groove to:
move horizontally along an upper horizontal section of the gated castellated groove as the cylindrical puck rotates about a rotational axis of the rotating motor shaft; and
upon reaching an interface point between the upper horizontal section and a vertical section of the gated castellated groove, move downward relative to the cylindrical puck to an interface point between the vertical section and a lower horizontal section of the gated castellated groove.

16. The blade-pitch change mechanism of claim 15, wherein:
engagement of the solenoid causes the rotating motor shaft to move upward; and
responsive to the upward movement of the rotating motor shaft, the cylindrical puck moves upward toward the cylindrical blade-pitch hub and engages with the drive pins of the cylindrical blade-pitch hub.

17. The blade-pitch change mechanism of claim 16, wherein, responsive to engagement of the cylindrical puck and the drive pins, rotation of the cylindrical puck causes rotation of the cylindrical blade-pitch hub.

18. The blade-pitch change mechanism of claim 17, wherein the blade-pitch adjustment groove has a blade-pitch restraint pin of a rotor blade coupled to the hub riding therein.

19. The blade-pitch change mechanism of claim 18, wherein movement of the blade-pitch restraint pin along the blade-pitch adjustment groove causes adjustment of a pitch of the rotor blade.

20. The blade-pitch change mechanism of claim 10, wherein:
a plurality of rotor blades are coupled to the hub; and a pitch of each of the plurality of rotor blades is adjustable in a stepwise fashion responsive to a position of a blade-pitch restraint pin of the rotor blade in the blade-pitch adjustment groove.

\* \* \* \* \*